Patented Jan. 2, 1951

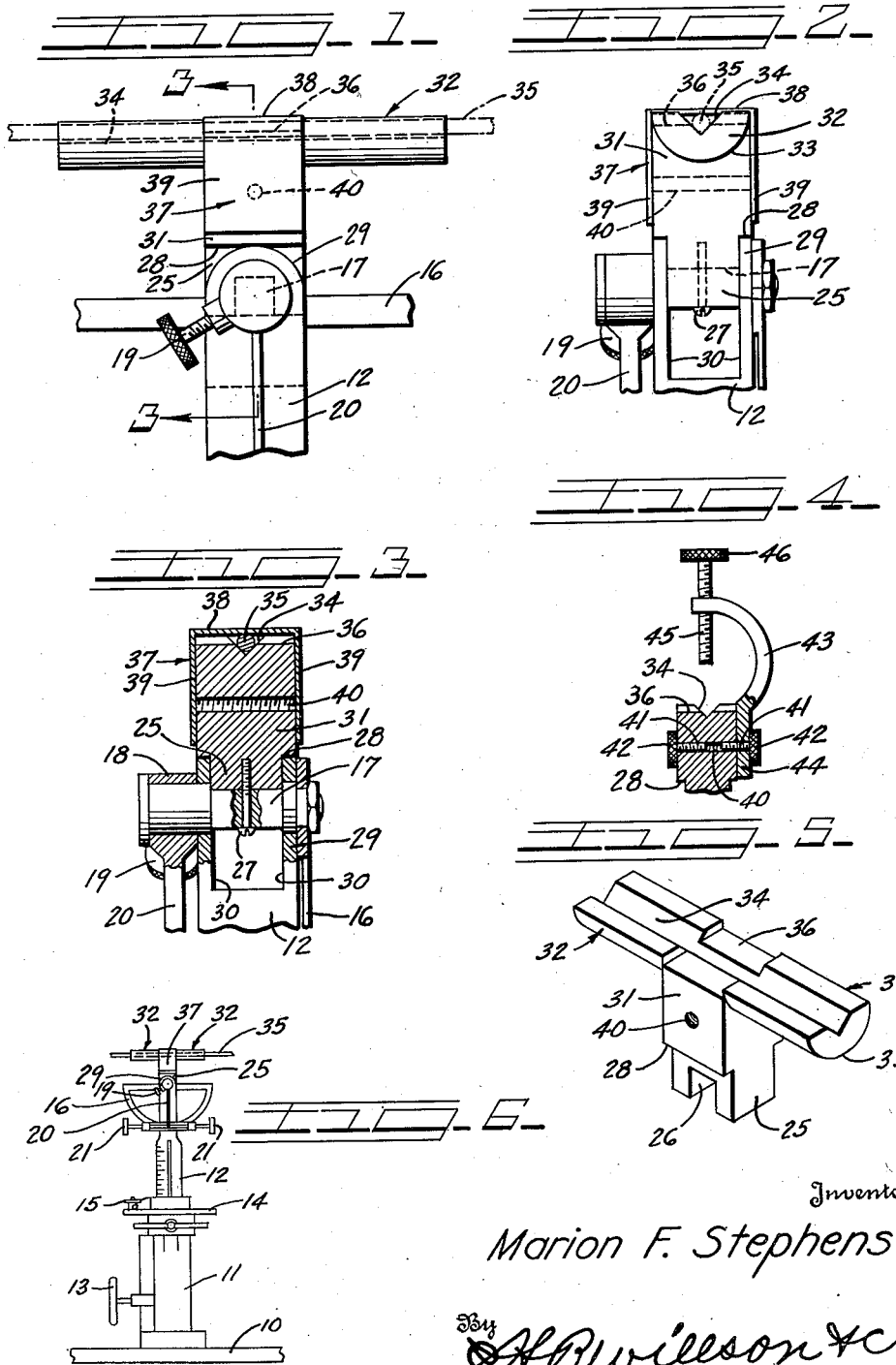

2,536,963

UNITED STATES PATENT OFFICE 2,536,963

PIN GUIDE AND SECURING MEANS FOR SURGICAL NAIL AND PIN DIRECTING APPARATUS

Marion F. Stephens, Sullivan, Ind., assignor to The Guidoscope Corporation, Chicago, Ill., a corporation of Illinois Application October 14, 1948, Serial No. 54,426

2 Claims. (Cl. 128—92)

This invention relates to pin or nail guide and securing means for surgical nail and pin directing apparatus. As conducive to a clearer understanding of this invention it may here be pointed out that in the extensive practice of hip nailing there has been developed what is called the Smith-Peterson technique. It comprises the insertion of a guiding pin or wire in the shaft of the femur, the wire serving to guide a cannulated Vitallium Smith-Peterson nail inserted in such a manner that it parallels and is in contact with the medial and anterior cortex of the neck of the femur. The guide, commonly called a Steinmann pin, is usually about three-thirty-seconds of an inch by ten inches and is removed from the bore of the nail after the latter has been properly positioned in the fractured neck of the femur. The Smith-Peterson nail for an adult is about five inches long and has a diameter of five-thirty-seconds of an inch although it is flanged and generally triangular in cross-section. It extends through a hole drilled in the hard outer portion of the femur, the hole extending in line with the center of the acetabulum at approximately a 20° anterior angle. The nail extends through the neck and preferably into the head or ball-like portion of the hip joint, and its function is of course to re-enforce the head on the neck of the femur. For the best results, the nail must be nearly in the direct weight-bearing line of the joint and so positioned that it receives the support of the dense corticle bone on both sides of the distal fragment. The insertion of both the guide pin and the nail must be controlled at all stages by two-plane radiography and in the past the successful placement of such fixation devices has depended largely upon the senses of sight and touch of the surgeon and has required a high degree of skill.

It is further important that under certain circumstances, such as the taking of X-ray photographs, a nail, a pin, or a drill be secured in a desired position in directing apparatus to prevent movement thereof during exposure. Obviously it is necessary that the pin, nail or drill be guided accurately and in a straight line both during operation, and during photography. An important object of the instant invention is, therefore, to provide guide apparatus in conjunction with a nail or pin directing apparatus such, for example, as that disclosed in my co-pending application Serial No. 573,954 entitled Post Adjusting Means for Wire and Nail Directing Apparatus filed January 22, 1945, and issued November 23, 1948, in Patent No. 2,454,680, which will ensure accurate directional guidance of the pin or nail, or drill utilized in conjunction therewith.

It is a further important object of this invention to secure such nail or pin firmly within the guide means during such times as such securing may be necessary, as, for example, in connection with the above mentioned X-ray photography.

Still another object of the invention is the provision of means in association with such a guide and securing apparatus, of means for holding a source of illumination, a camera or the like in proper alignment and relatively close relation with the guide means.

Other objects will in part be obvious, and in part be pointed out as the description of the invention proceeds, and shown in the accompanying drawing wherein there is disclosed a preferred embodiment of this inventive concept.

In the drawing:

Figure 1 is a side elevational view of one form of guide embodying features of the instant invention, portions thereof being broken away, and concealed portions being indicated in dotted lines.

Figure 2 is an end elevational view of the construction of Figure 1 as viewed from the right.

Figure 3 is a sectional view taken substantially along the line 3—3 of Figure 1 as viewed in the direction indicated by the arrows.

Figure 4 is a fragmentary sectional view similar to Figure 3 disclosing an additional attachment for the apparatus.

Figure 5 is a perspective view of the guide member per se dis-associated from the remainder of the mechanism, and Figure 6 is a reduced schematic view disclosing the relationship of the guide member to certain associated mechanism.

Similar reference characters refer to similar parts throughout the several views of the drawing.

Referring now to the drawing in detail, and particularly to Figure 6, the apparatus with which the guide is adapted to be utilized includes a base plate generally indicated at 10, upon which is mounted a tubular member 11 within which is linearly movable a main supporting post 12. Suitable means, forming no part of the instant invention, but more fully described in my co-pending application Serial No. 54,424 filed of even date herewith entitled Mechanism for Vertical Adjustment of Surgical Pin and Nail Directing Apparatus, is adapted to be actuated by means of an operating wheel 13, for vertical movement of post 12.

Means for the rotary adjustment of post 12, and consequently the guide of the instant invention is also provided, and includes a spider 14 and an operating wheel 15, such mechanism being described in detail in my above mentioned patent, and of which the instant application is a continuation in part.

Additional means are also provided for the angular adjustment of guide means in a vertical plane, and include a protractor 16 secured to one extremity of a square shaft 17, and provided with a collar 18 adapted to be secured to the shaft releasably as by means of a set screw 19. The collar includes a finger 20 which extends to a position between the extremities of two screws 21, the arrangement being such that these screws 21 may be utilized when set screw 19 secures collar 18 to its associated shaft 17, for relatively small movement of the guide member; or alternatively, upon release of set screw 19 a relatively wide radius of angular adjustment may be provided by movement of protractor 16 independently of finger 20 and its associated screws 21. The means for effecting such angular adjustment form no part of the instant invention and are described in detail in my co-pending application Serial No. 54,425 filed of even date herewith, entitled Mechanism for Angular Adjustment of Surgical Pin and Nail Directing Apparatus in a Vertical Plane.

Referring now to the guide means of the instant invention in detail, the guide comprises a T-shaped body, as shown in Figure 5, having its cross portion formed with a V-shaped channel and its depending portion or arm in the form of square shank 25. At the lower end of the latter is a transversely-extending flat-faced notch or recess preferably formed by bifurcating said lower end. The space between the bifurcations of the shank or attaching member is rectangular in cross-section, as indicated at 26, and adapted to seat over a square intermediate portion of shaft 17, being detachably secured in position as by a screw 27 threaded in a bore extending longitudinally of the shank. The shank 25 is provided with a pair of oppositely disposed shoulders 28 adapted to overlie the arcuate upper ends 29 of shaft supporting bifurcations 30 formed integrally with the upper extremity of supporting post 12. The shank 25 above shoulders 28 has flat side faces 31 and it is integral with the transversely extending portion 32 of the T-shaped body. The member 32 has a flat top in which is formed a longitudinally extending angular or V-shaped groove or channel 34 adapted for the reception of a wire 35 or the like, permitting free longitudinal sliding movement of the same in the absence of securing means to be more fully described hereinafter. It will be noted that the channel has two opposed flat walls which downwardly converge so that cylindrical elements of different diameters will be supported at two circumferentially-spaced points and will be guided in a straight-line path when moved longitudinally in the channel. The projecting ends or arms of the grooved guide member 32 have arcuate bottom faces 33 for convenience in lifting the guide from its support 17 when screw 27 is removed.

The depth of the guide groove or channel 34 is such that a large size pin or nail, or a drill or the like will extend above the flat portions of the upper face of the body 32. Such elements may be clamped in position by means of an inverted U-shaped spring clip 37 preferably formed from a strip of suitable resilient sheet metal. The flat top or connecting portion 38 of the clamp engages the projecting portion of the element while the two depending legs or side portions 39 frictionally engage the opposite flat sides 31 of the shank at the juncture of the latter with the body 32. To permit the clip or clamp to engage pins or wires of smaller diameter such as the element 35 as seen in Figures 1, 2 and 3, the body is formed in its top with a transverse channel 36 which intersects the channel 34 and is of less depth than the latter. The channel 36 extends from one flat face or area 31 to the other and is sufficiently wide to receive the cross portion 38 of the clip. Such portion may therefore frictionally engage and clamp an element 35 of less thickness than the depth of channel 34.

Under certain conditions, as for example, when a drill or a pin of relatively large diameter is employed, heavier clamping means may be required. To meet such contingency the guide member is provided with a threaded opening or bore 40 extending through the shank at right angles to the channel 34 and from one side 31 to the other. The opening is for the reception of screws 41 which may be provided with knurled heads 42 for the purpose of securing additional apparatus to the guide. One form of such apparatus is disclosed in Figure 4 and takes the form of a C-clamp 43 having a flat lower end which may be positioned against either face 31 and has an opening through which one of screws 41 is adapted to pass to secure the parts in related assembly. The upper end portion of clamp 43 extends transversely above channel 34 and is provided with a vertically positioned threaded bore within which is positioned a clamping screw 45 provided with a knurled head 46. This screw is perpendicular to said channel and may be readily adjusted to engage an element of relatively large diameter, or cross-sectional area, supported in channel 34. Obviously the clamp 43 may be secured to either side of the apparatus, and equally obviously, alternative apparatus such as a light or a camera may be fastened by either screw 42.

From the foregoing it will now be seen that there is herein provided an improved guide for surgical nails, pins, drills, or the like adapted to be utilized in conjunction with a nail or pin directing instruments which will effectively serve to guide the nail or pin in the desired direction, and which will further serve to secure or clamp such nail, pin, wire or the like against displacement during such time as such securing may be desirable or necessary.

I claim:

1. A wire or nail supporting and guiding means for attachment to an adjustable element of an instrument of the character described, said means comprising an elongated body having an integral depending attaching shank for supporting engagement with an element of an instrument, said shank at its juncture with said body having opposite, flat and parallel side faces, said body having a flat upper face formed with a central, longitudinally extending V-shaped guide channel, said body also having in its upper face a transversely extending channel intersecting and of less depth than said V-shaped channel, said transverse channel extending from one of said flat faces of said shank to the opposite flat face thereof, whereby an inverted U-shaped clip of resilient sheet metal may have its flat depending ends in frictional engagement with said flat sides of said shank while its connecting portion is disposed in said transverse channel to clamp a wire or nail of less thickness than the depth of said V-shaped channel.

2. A device for attachment to an adjustable element of a surgical instrument of the character described and for supporting and guiding a surgical wire, nail, drill or similar element, comprising a T-shaped body having an elongated cross-portion and a depending arm or shank for supporting engagement with an adjustable element of an instrument, said cross-portion having a flat top formed with a central V-shaped channel which extends from end-to-end of said cross-portion and is upwardly open throughout its length, said channel having opposed, downwardly-converging, flat walls to engage circumferentially-spaced points of cylindrical elements of different diameters and guide them in a straight-line path when moved longitudinally in the channel, said shank at its juncture with said cross-portion being of the same width as the latter and having opposite, flat and parallel side faces, said cross-portion having in its flat top a transversely-extending channel intersecting and of less depth than said V-shaped channel, said transverse channel extending from one of said flat faces of said shank to the opposite flat face thereof, an inverted U-shaped spring clip of resilient sheet metal having flat depending ends to frictionally engage said opposite flat faces of the shank, the top connecting-portion of said clip being movable into and out of said transverse channel to frictional clamp elements of different diameters in said V-shaped channel.

MARION F. STEPHENS.

REFERENCES CITED

The following references are of record in the file of this patent:

UNITED STATES PATENTS

| Number | Name | Date |
| --- | --- | --- |
| 1,994,422 | Sasek | Mar. 12, 1935 |
| 2,226,708 | Cleary | Dec. 31, 1940 |
| 2,267,157 | Lippincott | Dec. 23, 1941 |
| 2,356,591 | Jesionowski | Aug. 22, 1944 |

OTHER REFERENCES

Zentralblatt fur Chirurgie, for 1934, page 628.